United States Patent
Salajan et al.

(10) Patent No.: US 11,500,568 B2
(45) Date of Patent: Nov. 15, 2022

(54) LPM MANAGEMENT USING CONTINGENT AND CONDITIONAL INPUTS

(71) Applicant: International Business Machines Corporation, Armonk, NY (US)

(72) Inventors: Raul Salajan, Austin, TX (US); Vani D. Ramagiri, Austin, TX (US); Cindy Barrett, Austin, TX (US); Anil Kalavakolanu, Austin, TX (US); Srinivasa Raghavan Masthi Parthasarathi, Round Rock, TX (US); Douglas Griffith, Burnet, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 16/732,547

(22) Filed: Jan. 2, 2020

(65) Prior Publication Data
US 2021/0208807 A1    Jul. 8, 2021

(51) Int. Cl.
*G06F 9/455* (2018.01)
*G06F 3/06* (2006.01)
*G06F 16/23* (2019.01)
*G06N 20/00* (2019.01)
*G06F 9/50* (2006.01)

(52) U.S. Cl.
CPC .......... *G06F 3/0644* (2013.01); *G06F 3/0604* (2013.01); *G06F 3/0679* (2013.01); *G06F 9/45558* (2013.01); *G06F 9/5077* (2013.01); *G06F 16/23* (2019.01); *G06N 20/00* (2019.01); *G06F 2009/4557* (2013.01)

(58) Field of Classification Search
USPC ......................................................... 718/104
See application file for complete search history.

(56) References Cited

U.S. PATENT DOCUMENTS

| | | |
|---|---|---|
| 7,895,383 B2 | 2/2011 | Gregg et al. |
| 8,645,974 B2 | 2/2014 | Armstrong et al. |
| 8,700,752 B2 | 4/2014 | Bouillet et al. |
| 9,298,516 B2 | 3/2016 | Dusanapudi et al. |
| 9,766,834 B2 | 9/2017 | Chandolu et al. |
| 9,898,616 B2 | 2/2018 | Frazier et al. |

(Continued)

FOREIGN PATENT DOCUMENTS

CA      2697965 A1 *   3/2009  ............. G06Q 10/06

OTHER PUBLICATIONS

Pu et al., How to Manage Dynamic Logical Partitions (DLPARs) and Develop DLPAR-aware Applications, IBM eServer Solution Enablement, pp. 1-18, Jul. 9, 2003.

(Continued)

*Primary Examiner* — Kenneth Tang
(74) *Attorney, Agent, or Firm* — Garg Law Firm, PLLC; Rakesh Garg; Nathan Rau

(57) ABSTRACT

A method for managing Live Partition Mobility (LPM) on a computer system that includes receiving, by a processor, a LPM request, verifying that the LPM request includes a parameter that does not exceed a threshold value, and transmitting an approval query to an outside authority. The method also includes collecting a response to the approval query, scheduling, respondent to a positive approval query response, a LPM event, and executing the LPM event.

16 Claims, 6 Drawing Sheets

(56) References Cited

U.S. PATENT DOCUMENTS

| | | | |
|---|---|---|---|
| 9,983,917 B2 | 5/2018 | Betz et al. | |
| 10,162,681 B2 | 12/2018 | Atluri et al. | |
| 2008/0320123 A1* | 12/2008 | Houlihan | G06F 9/5077 709/224 |
| 2008/0320269 A1* | 12/2008 | Houlihan | G06F 9/4856 711/203 |
| 2009/0183166 A1 | 7/2009 | Dillenberger et al. | |
| 2010/0050172 A1* | 2/2010 | Ferris | G06F 9/4856 718/1 |
| 2010/0138530 A1* | 6/2010 | Brillhart | G06F 1/206 709/224 |
| 2010/0242045 A1* | 9/2010 | Swamy | G06F 9/455 718/1 |
| 2013/0055277 A1* | 2/2013 | Ashish | G06F 9/5083 718/104 |
| 2013/0246668 A1* | 9/2013 | Kaneda | G06F 3/0616 710/16 |
| 2014/0282527 A1 | 9/2014 | McConaughy et al. | |
| 2015/0295791 A1* | 10/2015 | Cropper | G06F 9/45558 709/226 |
| 2016/0306676 A1 | 10/2016 | Anumalasetty et al. | |
| 2017/0012825 A1* | 1/2017 | Chandolu | G06F 3/067 |
| 2018/0060759 A1* | 3/2018 | Chu | G06N 20/00 |
| 2018/0139148 A1* | 5/2018 | Gamage | H04L 41/122 |
| 2018/0293140 A1 | 10/2018 | Arroyo et al. | |
| 2019/0312912 A1* | 10/2019 | Mallya | G06Q 30/04 |
| 2020/0034211 A1* | 1/2020 | Kumar P | G06F 9/5088 |
| 2021/0004262 A1* | 1/2021 | Gupta | G06F 9/45558 |
| 2021/0373761 A1* | 12/2021 | Karr | G06F 3/061 |

OTHER PUBLICATIONS

Lynch, Live Partition Mobility, Forsthye Corporation, pp. 1-30, Nov. 11, 2014, http://www.circle4.com/forsythe/lpm2014.pdf.

Braitmaier, IBM System Automation for z/OS Processor Operations—LPAR Capacity Management, IBM Deutschland Research & Development, pp. 1-21, 2015.

Kuo, PowerVM: Power6—PowerVM Live Partition Mobility, IBM Taiwan, pp. 1-41, 2008.

\* cited by examiner

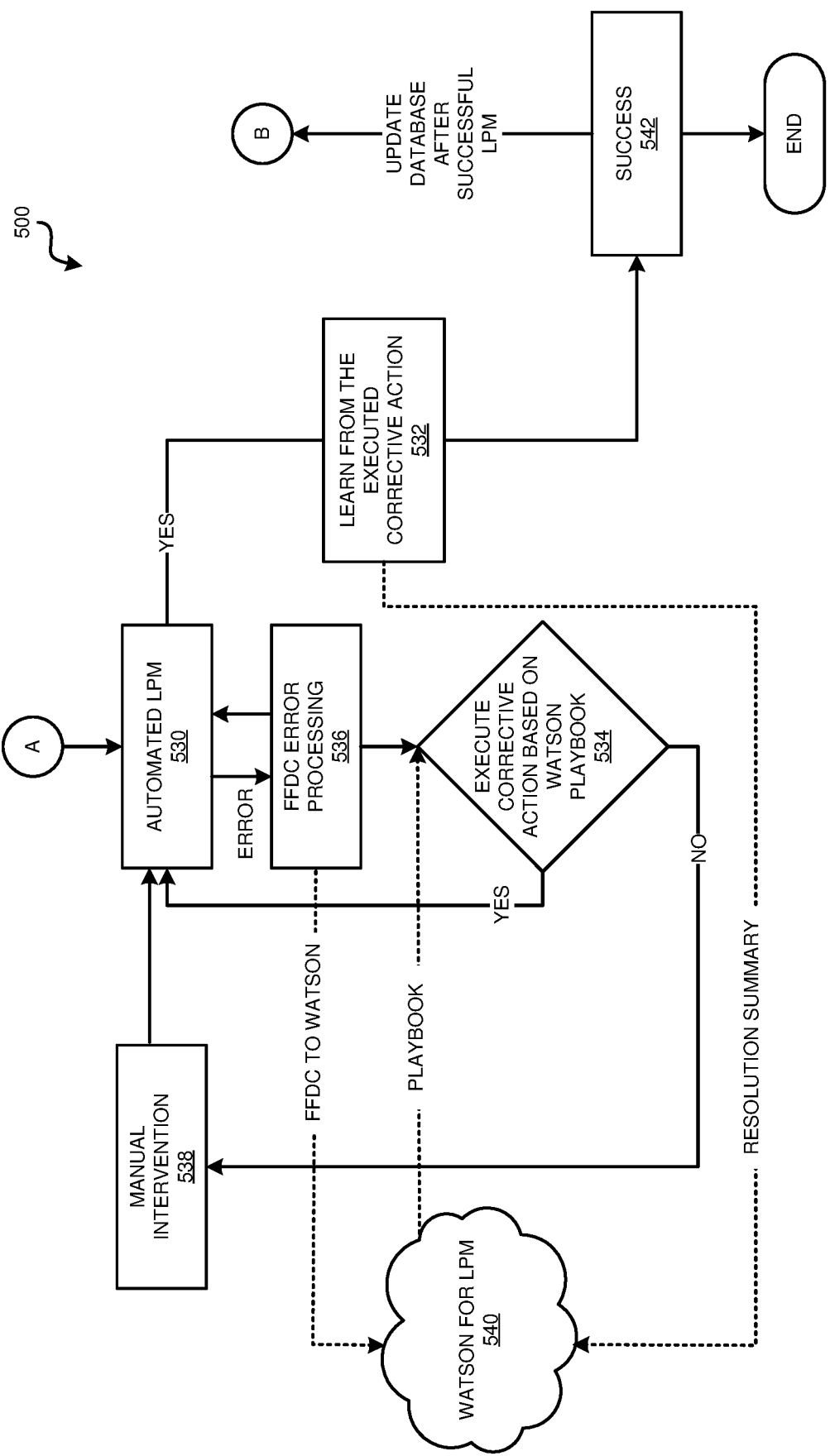

LPM MANAGEMENT USING CONTINGENT AND CONDITIONAL INPUTS

TECHNICAL FIELD

The present invention relates generally to a method, computer program product, and system for managing an application on a computer. More specifically, the present invention involves a method, computer program product, and system for managing Live Partition Mobility (LPM) on a computer system

BACKGROUND

The "Internet of things" (IOT) is a system of interrelated computing devices, mechanical and digital machines, objects, animals, or people that are provided with unique identifiers. The elements that make up an IOT system have the ability to transfer data over a network without requiring human-to-human or human-to-computer interaction. One example of an IOT system is a household where appliances, door locks, security system, and computing devices are linked together into a single network. Another example of an IOT system is a collection of smartphones, desktop computers, printers, and projectors sharing a common wireless network.

A logical partition (LPAR) is a subset of a computer's hardware resources, virtualized as a separate computer. In effect, a physical machine can be partitioned into multiple LPARs, each hosting a separate instance of an operating system. In the business and enterprise computing market, LPARs are often used to for hosting multiple server environments within a single large unit. LPARs are similar to hypervisors and both terms can be used interchangeably to describe server virtualization.

Dynamic Logical Partitioning (DLPAR) is the capability of a LPAR to be reconfigured dynamically without having to shut down the operating system that runs in the LPAR. DLPAR enables memory, CPU capacity, and I/O interfaces to be moved non-disruptively between LPARs within the same server. DLPAR provides the ability to logically attach and detach a managed system's resources to and from a LPAR's operating system without rebooting. Several features of DLPAR include: the Capacity Upgrade on Demand (CUoD) feature, which allows a customer to activate pre-installed but inactive processors as resource requirements change. Another feature is the Dynamic Processor Deallocation (DPD) feature that enables a processor to be taken offline dynamically when an internal threshold of recoverable errors is exceeded. DLPAR enhances the DPD feature by allowing an inactive processor to be substituted for the processor that is suspected of being defective. This online switch does not affect applications or kernel extensions. DLPAR enables cross-partition workload management, which is particularly important for server consolidation in that it can be used to manage system resources across partitions. Additionally, DLPAR requests are built from simple add and remove requests that are directed to LPARs. The user can execute these commands as move requests at the Hardware Management Console which manages all DLPAR operations.

LPM provides the ability to move AIX and Linux LPARs from one system to another. The mobility process transfers the system environment that includes the processor state, memory, attached virtual devices, and connected users. The source and target systems must have access to the same network and storage area networks but need not be of the same type; the only requirement is they use compatible processors. Partitions that are to be relocated must be fully virtualized (i.e. have no dedicated I/O adapters) although it is possible to use multi-pathing software to fail over to virtual adapters for the duration of the move. Any sized partition can be moved; essentially, memory is copied asynchronously from one system to another to create a clone of a running partition, with "dirty" pages being re-copied as necessary. When a threshold is reached (i.e. when a high percentage of the pages have been successfully copied across), the partition is transitioned to the target machine. Any remaining pages are then copied across synchronously. The agents that carry out the memory copying are nominated Virtual I/O Servers (VIOSs) on each machine; a standard Ethernet network is used for data transmission. LPM is used to avoid outages for planned server maintenance, for load balancing across multiple servers and for energy conservation.

SUMMARY

The illustrative embodiments provide a method for managing Live Partition Mobility (LPM) on a computer system that includes receiving, by a processor, a LPM request, verifying that the LPM request includes a parameter that does not exceed a threshold value, and transmitting an approval query to an outside authority. The method also includes collecting a response to the approval query, scheduling, respondent to a positive approval query response, a LPM event, and executing the LPM event.

An embodiment includes a computer program product for managing Live Partition Mobility (LPM), the computer program product made of one or more computer readable storage media and program instructions collectively stored on the one or more computer readable storage media, the program instructions. The instructions include program instructions to receive, by a processor, a LPM request, program instructions to verify that the LPM request includes a parameter that does not exceed a threshold value, and program instructions to transmit an approval query to an outside authority. The instructions also include program instructions to collect a response to the approval query, program instructions to schedule, respondent to a positive approval query response, a LPM event, and program instructions to execute the LPM event.

An embodiment includes a computer system that includes a processor, a computer-readable memory, a computer-readable storage device, and program instructions stored on the storage device for execution by the processor via the memory, the stored program instructions include program instructions to receive, by a processor, a LPM request, program instructions to verify that the LPM request includes a parameter that does not exceed a threshold value, and program instructions to transmit an approval query to an outside authority. The instructions also include program instructions to collect a response to the approval query, program instructions to schedule, respondent to a positive approval query response, a LPM event, and program instructions to execute the LPM event.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5B depicts a second portion of a flowchart of an example process for LPM management in accordance with an illustrative embodiment.

DETAILED DESCRIPTION

The illustrative embodiments recognize that there is a need for automated LPM strategy and custom approvals implementation. In an example, different system administrators managing different component systems may all desire an LPM to execute. Also, the LPM itself could be managed by another unassociated administrator. Therefore, each LPAR can require different sets of approvals based at least on different service levels and local system resource availability.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
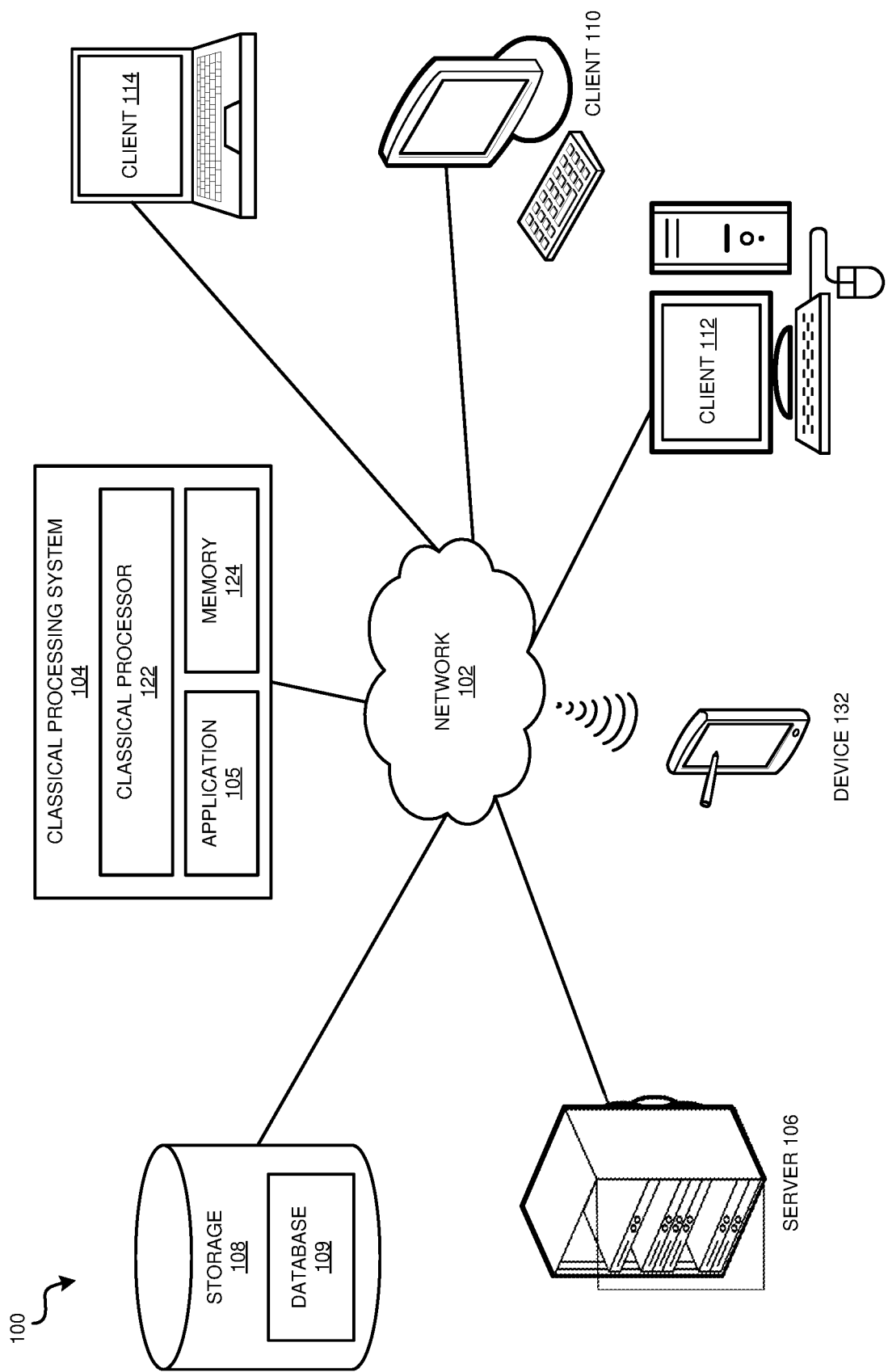
FIG. 1 depicts a block diagram of a network of data processing systems in which illustrative embodiments may be implemented.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers. Application 105 implements an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
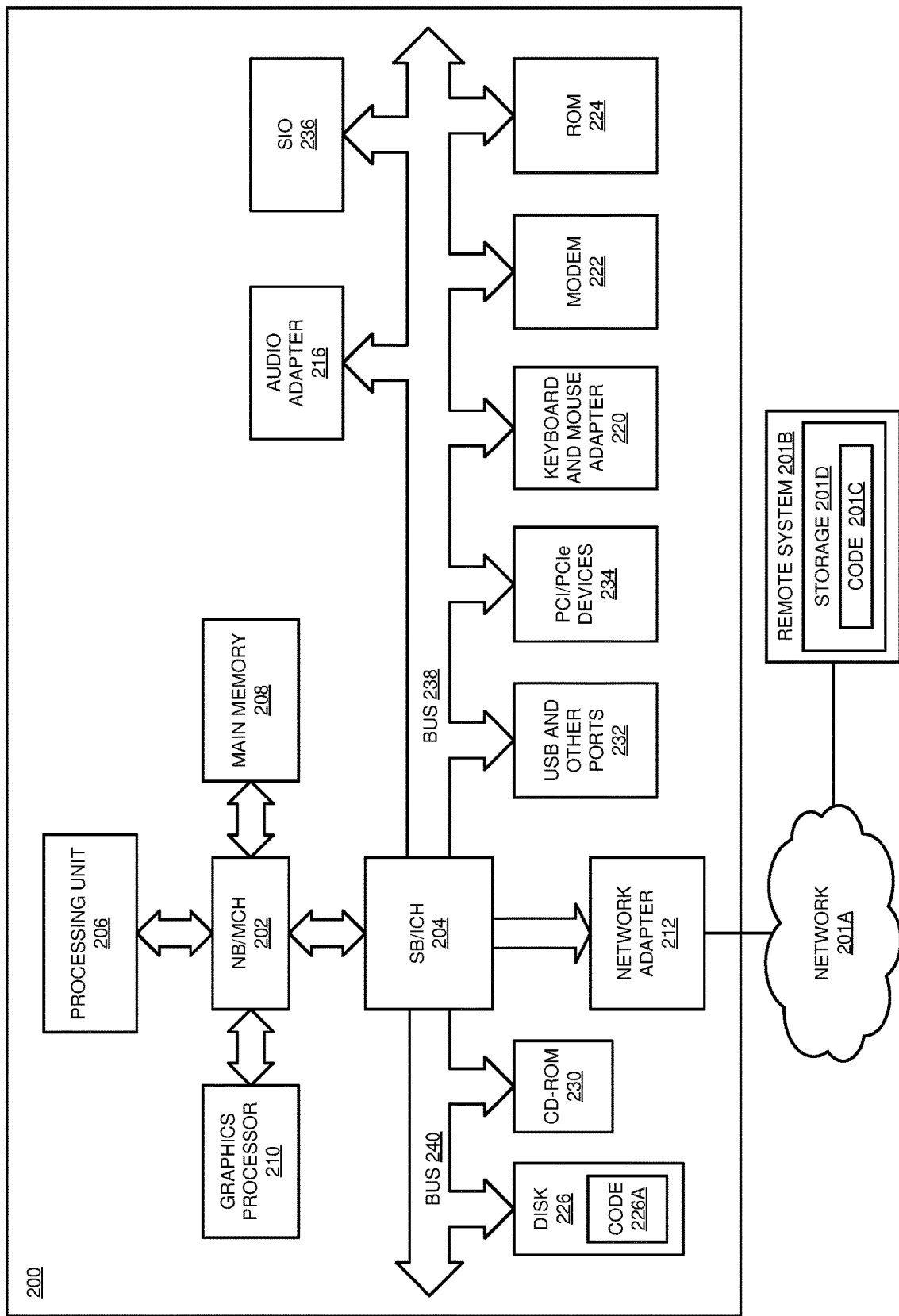
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as classical processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
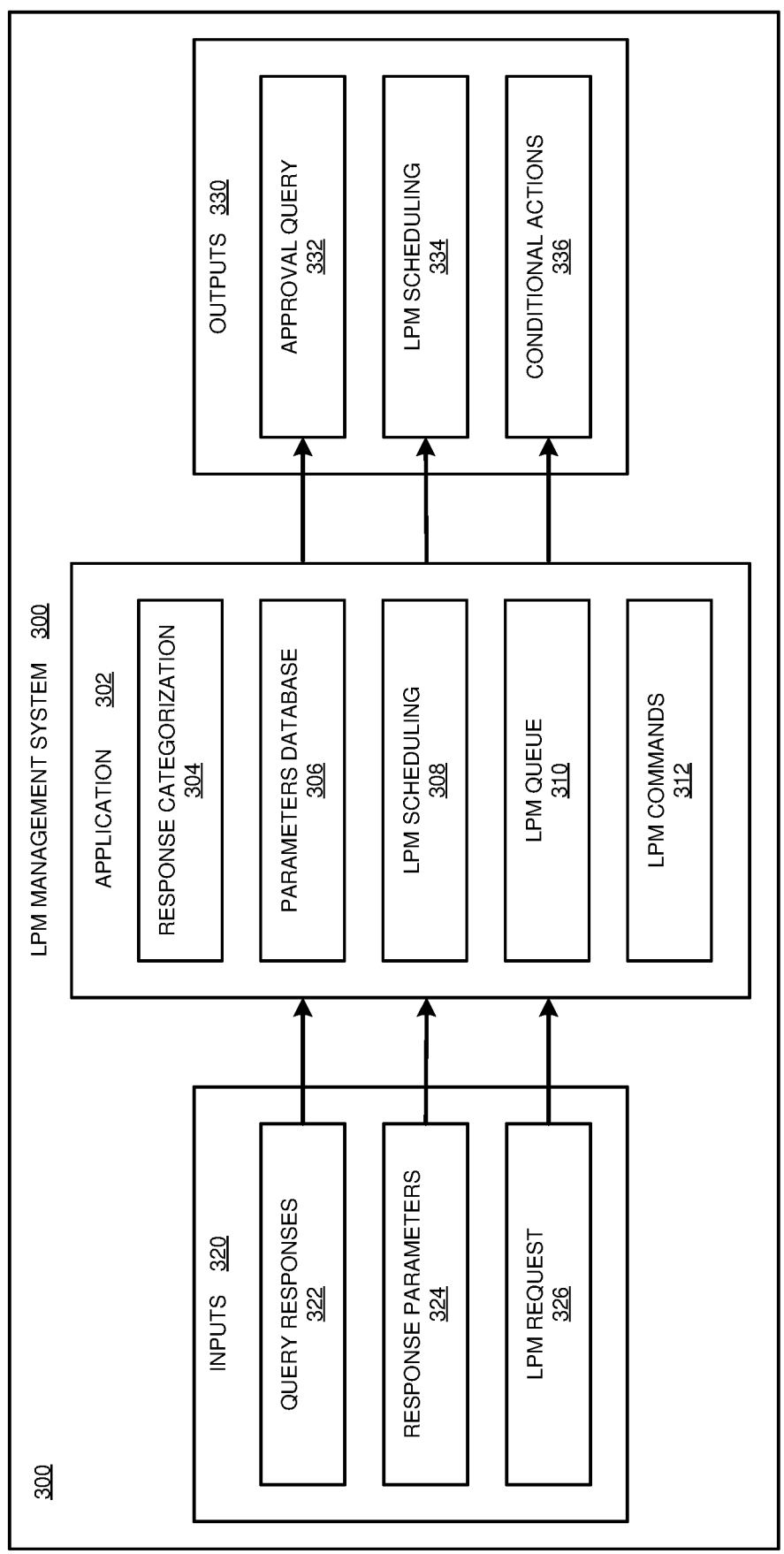
FIG. 3 depicts a block diagram of an application for LPM management in accordance with an illustrative embodiment.

With reference to FIG. 3, this figure depicts a functional block diagram of a LPM management system 300 that includes application 302 in accordance with an illustrative embodiment. Application 302 is an example of application 105 of FIG. 1 and executes in any of servers 104 and 106, clients 110, 112, and 114, and device 132 of FIG. 1. The server 106 runs the application 302 which is made of several software modules including a response categorization module 304, a parameters database module 306, a LPM scheduling module 308, a LPM queue module 310, and a LPM commands module 312. The application 302 accepts inputs 320 to include query responses 322, response parameters 324, and LPM requests 326. Furthermore, application 302 also has several outputs 330 to include approval queries 332, LPM scheduling messages 334, and conditional action commands 336.

In operation, the LPM management process begins with application 302 receiving a LPM request 326 from one or more elements of the server, such a server 104. Application 302 accepts the LPM request 326 and stored the request into the parameters database module 306 where the request is converted into a standard data format object, such as JSON or other commercially-acceptable format. The data object contains several parameters including, but not limited to, the request itself, the virtual machine (VM) identifier, a desired destination frame location, and a desired target time to execute the request.

Next, application 302 statically validates the LPM request 326 against previously-stored data stored in the parameters database module 306 to determine whether the proposed move will fit onto the destination memory locations as requested. The validation is done by retrieving the VM resources used and validates them against the available resources on the destination frame. The data object associated with the validation step includes entries for the request identifier, the VM identifier, the destination frame, the target time, available bandwidth, available memory, and available processors. Once validation is complete, the application 302 moves to the LPM scheduling module 308, where a scheduled time is sent to the destination for execution. Once the LPM request 326 has been received by the application 302 and processed, the application 302 generates an authorization request via the LPM queue module 310. The LPM queue module 310 sends as an output an approval query 332 to all elements that have authority over, of a say in, the execution of the scheduled LPM event. According to some embodiments, the elements with authority can include but are not limited to the destination frame, other VM's present in the processing system, the requesting VM, and the like. Other embodiments are possible and are not limited by this example.

Next, after the approval query messages 332 are sent out to all interested elements, query responses 322 are received indicating either an approval (positive) or disapproval (negative) response. The query responses 322 are collated and stored by the application 302 in the response categorization module 304 of the application 302. In some embodiments, the LPM request 326 includes parameter values that are analyzed by the response categorization module 304 to determine whether the values do not exceed a threshold value. In some embodiments, the threshold value can be associated with a minimum memory size, a desired time target, a latency value, and the like. In some embodiments, the query responses 322 also include parameter data 324 such as approval/disapproval, designation of the sending element, preferred contact method, and the like.

Next, the application 302 through the response categorization module 304 collates and sorts the query responses 322 and the associated response parameters 324 and sends the data to update the parameters database 306. Once all of the query responses 322 have been received, the response categorization module 304 reviews the data and if any disapproval responses have been received, and instructs the LPM commands module 312 to generate a conditional actions signal 336 to send a message to the originator of the LPM request and rejecting the request. In addition, the LPM commands module 312 also sends a conditional actions message to the destination frame(s) releasing and freeing those resources previously reserved for the LPM event. When a LPM event is scheduled and fully executed, the LPM scheduling module 308 also updates the parameters database module 306 with details about the LPM event and frees up the system resources as needed. In some embodiments, the database module 306 updates a mathematical model stored in the database, such as database 109 of FIG. 1.

Figure 4:
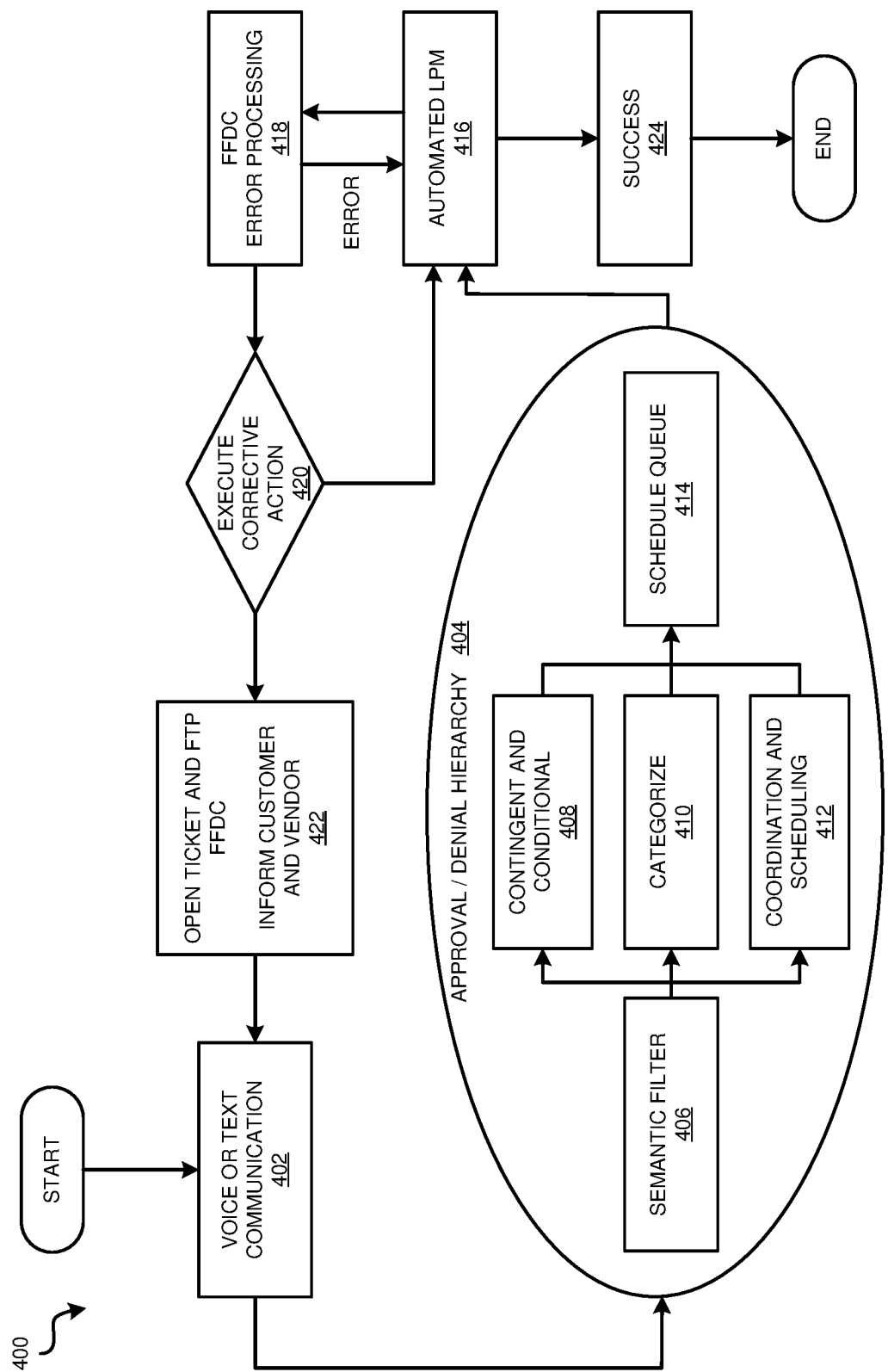
FIG. 4 depicts a block diagram of an approval/denial hierarchy process related to LPM management in accordance with an illustrative embodiment.

With reference to FIG. 4, this figure depicts a block diagram of an approval/denial hierarchy process 400 related to LPM management in accordance with an illustrative embodiment. Process 400 is one embodiment of the response categorization module 304 of application 302 as described herein. Process 400 begins at block 402, where a voice or text communication message is received. In some embodiments, the voice or text message received can be an example of the query response 322 and the response parameters 324 of FIG. 3.

Next, at the approval/denial hierarchy block 404, several events occur, beginning with the output of the voice/text communications block 402 being input into the semantic filter 406. The output of the semantic filter 406 is sent to three blocks at once: the contingent and conditional block 408, the categorize block 410, and the coordination and scheduling block 412. The output of all three blocks 408, 410, and 412 are sent to the scheduling queue 414. In some embodiments, the scheduling queue 414 is LPM scheduler module 308 of FIG. 3. The output of the schedule queue 414 and the approval/denial hierarchy block 404 is sent to the automated LPM block 416. The automated LPM block 416 has two outputs; one output is sent to the FFDC error processor block 418. If any errors are detected, the message is sent back to the automated LPM 416 for analysis. Once the message is processed by the FFDC error processing block 418, it is sent to decision block 420 where a decision is made to execute or not execute a corrective action. If is corrective action is required, the message is sent back to block 416. Otherwise, the message is sent to block 422, where an open ticket and FTP/FFDC are generated, and the customer, vendor, and/or the element is informed of the response. FTP is the abbreviation for File Transfer Protocol while FFDC stands for First Failure Data Capture. Finally, once all errors have been detected and analyzed, the automated LPM block 416 generates a signal, such as a scheduled LPM scheduling signal 334, and sends it to the destination frame and other interested elements of the processing system for further action.

Figure 5A:
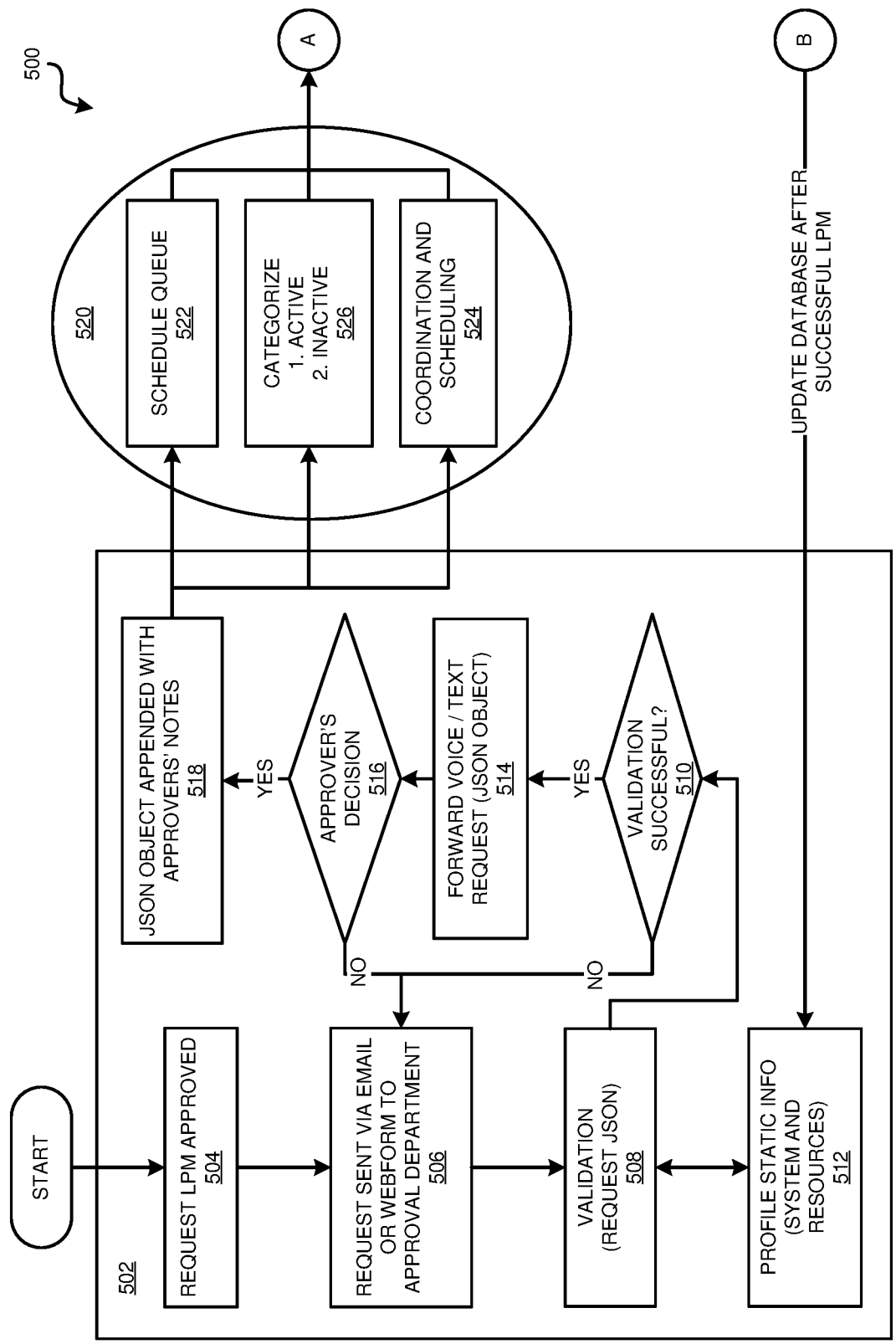
FIG. 5A depicts a first portion of a flowchart of an example process for LPM management in accordance with an illustrative embodiment.

With reference to FIGS. 5A and 5B, these figures depict a flowchart of an example LPM management process 500 in accordance with an illustrative embodiment. Process 500 begins at block 502 where a sub process for generating a data object, such as a JSON data object, is sent out for further analysis. The process 500 begins at block 504, where a request LPM approved signal is received. Next, at block 506, one or more requests are sent via email, text, or the internet to the approval departments of various interested authorities for their approval/disapproval. Next, at block 508, a validation activity is started. In some embodiments, the validation uses a JSON data object. The output of block 508 is sent to decision block 510 and to block 512, where a profile of the static information, including system and resource information) is sent to update the database after a successful LPM event takes place. Next, at decision block 510, the process 500 determines whether the validation activity was successful. If yes, the process 500 moves to block 514. If the answer is "No", the process returns to block 506 to send another request. At block 514, a voice/text message is forwarded to outside authorities for approval. In some embodiments, these messages use a JSON data object format. Next, at decision block 516, the approver's return with either an approval or a disapproval response. If the response is positive (approved, or "Yes"), the process 500 continues to block 518. If disapproved (denied, or "No"), the process returns to block 506 to begin the request process over again, At block 518, and after approver from the outside authority, a message, appended with the approver's notes are sent to scheduling sub process block 520 for further analysis. In some embodiments, the message from block 518 is a JSON data object.

At the scheduling sub process block 520, the message from block 518 is sent to the schedule queue at block 522. Additionally, the message from lock 518 is also sent to block 526 where the message is categorized as active or inactive. Finally, the message from block 518 is also send to block 524, where coordination and scheduling decisions are made. The output of sub process 520 is sent (via circled connector "A") to block 530, where an automated LPM is generated. Next, at block 536, the message is analyzed for errors using FFDC error processing. At the same time, output data from block 536 is sent to a learning engine database, such as IBM Watson® for analysis and storage. Any errors that are detected cause a signal to be generated and sent back to block 530. When errors are detected at block 536 the process 500 moves to decision block 534, where a decision is made by the process or to utilize strategies from a database, such as IBM Watson®, to execute corrective actions. If the decision is made to not utilize the database strategies, the process 500 flow continues to block 538 in an effort to conduct manual intervention to compensate for errors in the message. If at decision block 534, a decision is made to utilize the database strategies, the process 500 continues back to block 530.

Returning to block 530, if no errors are detected in the message, the process 500 continues to block 532, where the database learns from the executed corrective action via blocks 536 and 534. Additionally, the output of block 532 is sent to the database 540. According to some embodiments, the database 540 is a cloud-based database such as database 109 of FIG. 1 and accessed via network 102 of FIG. 1. In other embodiments, the database is an example of the IBM Watson® system. The output of block 532 is also sent to block 542, signaling a successful LPM event. After a successful LPM event, the database is updated with parameters of the LPM event (via circled connector "B") to block 512 to update the system information as needed.

Thus, a computer implemented method, computer program product, and system are provided in the illustrative embodiments for managing LPM in a computer processing environment. Where an embodiment or a portion thereof is described with respect to a type of device, the computer implemented method, computer implemented program product, or system, or a portion thereof, are adapted or configured for use with a suitable and comparable manifestation of that type of device.

Where an embodiment is described as implemented in an application, the delivery of the application in a "Software as a Service" (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based email), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products for managing LPM in a computer processing environment according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing Live Partition Mobility (LPM) on a computer system, comprising:
receiving, by a processor, a LPM request, the LPM request comprising a request to perform an LPM event, the LPM event comprising migrating a virtual machine from a first physical computer system to a second physical computer system, wherein the LPM request comprises a virtual machine identifier identifying the virtual machine, a destination identifier identifying the second physical computer system, and a desired execution time of the LPM event;
validating, by determining that an amount of a resource used by the virtual machine is smaller than an available amount of the resource in the second physical computer system, the LPM request, the validating resulting in a validated LPM request, the validating further comprising determining that the desired execution time of the LPM event does not exceed a threshold value associated with a desired time target, the validating performed using a data object including the desired execution time of the LPM event;
transmitting an approval query to an outside authority, the approval query requesting approval for performance of the LPM event specified by the validated LPM request;
collecting a response to the approval query;
scheduling, respondent to a positive approval query response, the LPM event for execution at an execution time; and
executing, at the execution time, the LPM event, the executing migrating the virtual machine from the first physical computer system to the second physical computer system.

2. The method of claim 1, further comprising:
respondent to the LPM event failing to execute, updating a mathematical model stored in a database; and
executing an error analysis procedure on the mathematical model based on the failed LPM event.

3. The method of claim 2, further comprising:
updating a learning engine database based on a result of the error analysis.

4. The method of claim 1, wherein the amount of the resource is at least one of a subset of a set of parameters that includes bandwidth, memory, and processors.

5. The method of claim 1, further comprising receiving a negative approval query response from the outside authority and freeing computer resources at a target destination.

6. The method of claim 1, wherein, subsequent to executing the LPM event, a database is updated.

7. A computer program product for managing Live Partition Mobility (LPM), the computer program product comprising:
one or more computer readable storage media; and
program instructions collectively stored on the one or more computer readable storage media, the program instructions comprising:
program instructions to receive, by a processor, a LPM request, the LPM request comprising a request to perform an LPM event, the LPM event comprising migrating a virtual machine from a first physical computer system to a second physical computer system, wherein the LPM request comprises a virtual machine identifier identifying the virtual machine, a destination identifier identifying the second physical computer system, and a desired execution time of the LPM event;
program instructions to validate, by determining that an amount of a resource used by the virtual machine is smaller than an available amount of the resource in the second physical computer system, the LPM request, the validating resulting in a validated LPM request, the validating further comprising determining that the desired execution time of the LPM event does not exceed a threshold value associated with a desired time target, the validating performed using a data object including the desired execution time of the LPM event;
program instructions to transmit an approval query to an outside authority, the approval query requesting approval for performance of the LPM event specified by the validated LPM request;
program instructions to collect a response to the approval query;
program instructions to schedule, respondent to a positive approval query response, the LPM event for execution at an execution time; and
program instructions to execute, at the execution time, the LPM event, the executing migrating the virtual machine from the first physical computer system to the second physical computer system.

8. The computer program product of claim 7, further comprising:
program instructions to, respondent to the LPM event failing to execute, update a mathematical model stored in a database; and
program instructions to execute an error analysis procedure on the mathematical model based on the failed LPM event.

9. The computer program product of claim 8, further comprising:
program instructions to update a learning engine database based on a result of the error analysis.

10. The computer program product of claim 7, wherein the amount of the resource is at least one of a subset of a set of parameters that includes bandwidth, memory, and processors.

11. The computer program product of claim 7, further comprising receiving a negative approval query response from the outside authority and freeing computer resources at a target destination.

12. The computer program product of claim 7, wherein, subsequent to executing the LPM event, a database is updated.

13. The computer program product of claim 7, wherein computer usable code is stored in a computer readable storage device in a data processing system, and wherein the computer usable code is transferred over a network from a remote data processing system.

14. The computer program product of claim 7, wherein computer usable code is stored in a computer readable storage device in a server data processing system, and wherein the computer usable code is downloaded over a network to a remote data processing system for use in a computer readable storage device associated with the remote data processing system.

15. A computer system, comprising:
a processor;
a computer-readable memory;
a computer-readable storage device; and
program instructions stored on the storage device for execution by the processor via the memory, the stored program instructions comprising:
program instructions to receive, by the processor, a LPM request, the LPM request comprising a request to perform an LPM event, the LPM event comprising migrating a virtual machine from a first physical computer system to a second physical computer system, wherein the LPM request comprises a virtual machine identifier identifying the virtual machine, a destination identifier identifying the second physical computer system, and a desired execution time of the LPM event;
program instructions to validate, by determining that an amount of a resource used by the virtual machine is smaller than an available amount of the resource in the second physical computer system, the LPM request, the validating resulting in a validated LPM request, the validating further comprising determining that the desired execution time of the LPM event does not exceed a threshold value associated with a desired time target, the validating performed using a data object including the desired execution time of the LPM event;
program instructions to transmit an approval query to an outside authority, the approval query requesting approval for performance of the LPM event specified by the validated LPM request;
program instructions to collect a response to the approval query;
program instructions to schedule, respondent to a positive approval query response, the LPM event for execution at an execution time; and
program instructions to execute, at the execution time, the LPM event, the executing migrating the virtual machine from the first physical computer system to the second physical computer system.

16. The computer system of claim 15, further comprising:
program instructions to, respondent to the LPM event that failed to execute, update a mathematical model stored in a database; and program instructions to execute an error analysis procedure on the mathematical model based on the failed LPM event.

\* \* \* \* \*